United States Patent Office

3,256,146
Patented June 14, 1966

1

3,256,146
FUNGICIDAL TETRACHLORONITROANISOLE
Eugene D. Witman, Pittsburgh, Pa., assignor to Pittsburgh Plate Glass Company, Pittsburgh, Pa., a corporation of Pennsylvania
No Drawing. Filed Nov. 9, 1962, Ser. No. 236,681
9 Claims. (Cl. 167—30)

This invention relates to the control of plant pests and it has particular relation to the control of both seedborne and soilborne pests such as the smuts and bunts that infect cereal crops, such as wheat, oats, barley and the like.

It has heretofore been recognized that a considerable number of fungus growths, e.g., the "smuts" and "bunts," constitute a serious source of loss in the growing of cereal crops, such as wheat, oats and barley. These organisms may be carried in seed and also may contaminate the soil itself so that seed planted in the soil becomes infected, thus producing smutting and destruction of the grain as it develops. Also, some smutting organisms carried in the soil become windborne and may be carried to the growing plants by that agency or by other agencies, and thus infect the plants or developing grain thereof. Among the organisms which thus act on cereals, such as wheat, the following are important:

Smooth-spored bunt (*Tilletia foetida*)
Dwarf bunt (special species of *Tilletia caries*)
Flag smut of wheat (*Urocystis tritici*)

Of these several types of fungus organisms, flag smut (*Urocystis tritici*), when it occurs, has been found to be particularly difficult to control by means of heretofore available pesticides. Various materials known to have fungicidal properties have been tested against it, but none has been observed that will provide an adequate control under various conditions of seed infection and soil infection. It is especially difficult to control when soilborne. Some fungicides, when applied to seed, would kill some of the fungi or spores thereof; however, they were not effective against the soilborne fungi. One of the more effective agents against common bunt comprises hexachlorobenzene. However, this material is not effective against this more resistant flag smut, such as is important in some localities in continental North America, e.g., in the United States and Canada, and also in Australia.

This invention comprises the discovery that a tetrachloronitrophenyl ether, such as 2,3,5,6-tetrachloronitroanisole, constitutes a superior agent for use against smuts, including even flag smut (*Urocystis tritici*) occurring in cereal crops, such as wheat, against which no material heretofore known has been satisfactory. Moreover, it is highly effective against an especially wide spectrum of fungus organisms, both in the seedborne and soilborne states. Such organisms include:

Covered smut of barley (*Ustilago hordei*)
Shallow loose smut of barley (*Ustilago nigra*)
Loose smut of oats (*Ustilago avenae*)
Covered smut of oats (*Ustilago kolleri*)

The modes of application in the control of these fungi are similar to those involved in the control of the fungi attacking wheat.

The compound is a crystalline material which has been described in the Journal of the Chemical Society, 1943, page 233, and reference may be had to the latter for the preparation of the material. Additionally, it is effective against all, or most of the other smuts and bunts that infest cereals, such as wheat. Therefore, a tetrachloronitrophenyl ether composition which can be used in the control of flag smut can with equal facility be used against other organisms.

In order to use 2,3,5,6-tetrachloronitroanisole as a fungicide, it may be diluted in various ways. For example, it may be diluted with a nonreactive pulverulent material, such as china clay, montmorillonite, attapulgite and others. Also, silicas such as the hydrated silica sold under the trade name of Hi-Sil 233, calcium silicate sold commercially as Silene, magnesium silicate and others, may be employed as pulverulent diluents.

Powders thus obtained containing the pulverulent diluent and the 2,3,5,6-tetrachloronitroanisole may be employed as aqueous suspensions or dispersions, being applied to the seed wheat in an appropriate amount, for example, about 0.5 ounce to about 4 ounces per bushel. Amounts of 1 ounce to about 2 ounces have been found to be particularly efficacious for the purpose. Water in an amount to wet the surface of the wheat may be included and is subsequently evaporated to leave the wheat in dry state for sowing. The water may be used in an amount of about 1 part to 10 parts by weight to 100 parts by weight of wheat treated.

If desired, the powders may also include surfactants, such as wetting agents, emulsifiers, stickers, cellulose acetate butyrate as ethyl or methyl cellulose, and the like, which will facilitate the dispersion and retention of the powders upon the cereal grain to be treated. The surfactant may be used in an amount of about 0.1 percent to about 5 percent by weight based upon the mixture of active and insert ingredients.

The 2,3,5,6-tetrachloronitroanisole is substantially insoluble in water, but may be made up into a solution in an organic solvent wherein it is easily soluble. Appropriate solvents comprise ethyl alcohol, isopropyl alcohol, butyl alcohol, hydrocarbons such as xylene, kerosene and the like. The resultant solutions may be mixed with dispersing agents to provide a solution which will instantly emulsify in water. Such aqueous emulsion may then be applied to wheat seed in appropriate concentrations to control various smuts.

The amount of diluents (pulverulent or fluid) used with the tetrachloronitroanisole may vary percentagewise in a range of about 10 percent to about 90 percent by weight. Indeed, it is considered that the substantially pure compound may be used (without dilution). In the latter instance, the material, of course, should be as finely pulverized as practicable. Pulverization may be effected by micronizing on a fluid energy vortex mill, if so desired.

The following are illustrative examples of some pesticidal compositions embodying the use of tetrachloronitroanisole as the active ingredient.

*Example I*

In accordance with this example, a wettable powder is provided wherein the pulverulent diluent is attapulgite. Wetting and dispersing agents for the system comprise Nekal BX-78, which is sodium alkyl naphthylene sulfonate and is a well-known wetting agent, and Polyfon F which is sodium lignosulfonate. These are well known surfactants and can be replaced by others of the same or similar physical properties. The formulation was as follows:

| | Parts by weight |
|---|---|
| Tetrachloronitroanisole (90 percent purity) | 55.6 |
| Nekal BX-78 | 1 |
| Polyfon F | 1 |
| Attapulgite | 47.7 |

This mixture constituted substantially a 50 percent concentration of the active ingredient. A similar formulation was also prepared comprising:

| | Parts by weight |
|---|---|
| Tetrachloronitroanisole (90 percent purity) | 83.3 |
| Nekal BX-78 | 1 |
| Polyfon F | 1 |
| Attapulgite | 22.7 |

These formualtions were ground by microgrinding. The resultant finely divided powders could be mixed in water in concentrations varying over a relatively wide range to provide formulations for spraying or for applying as a dip to seed grain, such as wheat or the like.

*Example II*

The preparation of a dust wherein the tetrachloronitroanisole constituted the active ingredient, is illustrated as follows:

| | Parts by weight |
|---|---|
| Tetrachloronitroanisole (90 percent active ingredient) | 27.8 |
| Inert powder (e.g., talc or magnesium) | 72.2 |

This dust could be mixed with seed, such as wheat, or could be applied to fields for purposes of soil disinfection, or to the growing vegetation by dusting in well-known manner.

*Example III*

This example is illustrative of the preparation of an emulsifiable solution of the active tetrachloronitroanisole in an organic solvent. The composition was as follows:

| | Parts by weight |
|---|---|
| Tetrachloronitroanisole (90 percent purity) | 27.8 |
| Xylene | 60.2 |
| Wetting agent (Atlas G-2080) | 12 |

Needless to say, in this composition the wetting agent could be replaced by other conventional surfactants employed for wetting purposes. An example of such surfactant could be polyoxyethylene palmitate (Atlas G-2079) or polyoxyethylene sorbitol oleate, or a mixture of the latter with polyoxyethylene fatty amine, such mixture is sold as Atlas G-2090. Other anionic, cationic or non-ionic emulsifiers could be used. The emulsion could be mixed with water to provide an aqueous emulsion containing the active ingredient (tetrachloronitroanisole) and could thus be used in well-known manner for treating seed wheat or other seed for purposes of controlling pests.

The mixtures of Examples I and II may be applied as dusts to seeds, such as seed wheat. Application may be effected by mixing the seed with the dry pulverulent material or with an aqueous suspension thereof. The rate of application may be in a range of about 0.1 ounce to about 5 ounces of active 2,3,5,6-tetrachloronitroanisole per bushel of wheat. When the seed wheat is treated with wettable powder containing 0.5 ounce to 1 ounce of 2,3,5,6-tetrachloronitroanisole per bushel of seed, almost perfect protection to the seed against flag smut, both seedborne and soilborne, is obtained. This is also true of the common bunts and smuts, even in localities where the organisms are of high incidence. This is true even in those localities in the state of Washington where a very high incidence of flag smut in wheat has been encountered. No other material heretofore tested has been effective in this manner.

In like manner, the solution of 2,3,5,6-tetrachloronitroanisole of Example III may be dispersed in sufficient water to moisten the wheat, the rate of application with respect to the active ingredient being approximately within the foregoing proportions. The wheat may then be dried and sowed in the usual manner. Good protection against the foregoing organisms is obtained.

It will also be apparent that dispersions of the active ingredient, as well as the dusts previously described, may be applied to the soil and worked into the latter to give a reasonable distribution of the active ingredient in order to effect control of the organisms contained in the soil. It is to be understood that when applied to the soil at a rate of about 15 pounds to about 100 pounds per acre, good kills of the smuts and bunts can be obtained.

While the tetrahalonitroanisole is excellent for control of smuts and bunts in wheat, particularly in the control of flag smut of wheat, concurrently, it is also effective as an acaricide, as a nematocide and as a rodent repellant. Some seed and soilborne organisms which it controls are listed as follows:

*Venturia inaequalis*
*Plasmodiophora brassicae*
*Rhizoctonia solani*
*Alternaria solani*
*Sclerotinia fructicola*
*Urocystis cepulae*
*Urocystis colchici*
*Tilletia caries*
*Tilletia foetida*
*Tilletia controversa*
*Tilletia tritici*
*Urocystis tritici*
*Ustilago avenae*
*Ustilago hordei*
*Gymnosporangium juniperi-virginianae*
*Diplodia natalensis*

The materials of Examples I to III may be used in the treatment of seeds or soil infested with the above organisms.

While specific examples of the invention have been set forth hereinabove, it is not intended to limit the invention solely thereto, but to include all of the variations and modifications falling within the scope of the appended claims.

I claim:

1. The method of controlling smuts, which comprises applying to wheat used as seed, 2,3,5,6-tetrachloronitroanisole.

2. The method of controlling smuts, which comprises applying to seed wheat, 2,3,5,6-tetrachloronitroanisole in an amount of about 0.1 ounce to about 5 ounces per bushel of seed wheat.

3. The method of growing wheat which is substantially free of smuts and bunts, both soilborne and seedborne, which comprises treating seed wheat prior to planting with about 0.1 ounce to about 5 ounces per bushel of seed wheat, of 2,3,5,6-tetrachloronitroanisole and a surfactant.

4. A pesticidal composition comprising a wettable powder which is a mixture of tetrachloronitroanisole and an inert pulverulent diluent.

5. The method of controlling fungi on cereal crops which comprises applying to the seed of said crops an aqueous dispersion of tetrachloronitroanisole.

6. A method of controlling flag smut upon wheat which comprises applying to seed wheat an aqueous dispersion of tetrachloronitroanisole.

7. A method of controlling flag smut upon wheat which comprises applying to seed wheat an aqueous dispersion of tetrachloronitroanisole in an amount of about 0.1 ounce to about 5 ounces per bushel of wheat.

8. The method of controlling pests which attack plant crops, which comprises incorporating into the soil in which said plants are grown, about 15 pounds to 100 pounds of 2,3,5,6-tetrachloronitroanisole per acre.

9. A method of controlling fungi on cereal crops which comprises incorporating into the soil in which that cereal crop is grown 2,3,5,6-tetrachloronitroanisole.

References Cited by the Examiner

UNITED STATES PATENTS 3,081,224   3/1963   Thorson _____ 167—53

OTHER REFERENCES

Jour. of the Chemical Society, 1943, p. 233.
Purdy: Phytopathology, vol. 52, pages 25 and 26, January 1962.

JULIAN S. LEVITT, *Primary Examiner.*

J. D. GOLDBERG, *Assistant Examiner.*